(12) United States Patent
Zhang et al.

(10) Patent No.: US 6,278,584 B1
(45) Date of Patent: Aug. 21, 2001

(54) FRICTION CONTROL ON HGA RAMP LOAD/UNLOAD SURFACE

(75) Inventors: Jing Tony Zhang, Woodbury; Peter Raymond Segar, Burnsville; Zine Eddine Boutaghou, Yadnais Heights; Jorge Vicente Hanchi, Bloomington, all of MN (US)

(73) Assignee: Seagate Technology, Inc., Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,949

(22) Filed: May 14, 1998

Related U.S. Application Data

(60) Provisional application No. 60/063,615, filed on Oct. 27, 1997.

(51) Int. Cl.[7] .................................................. G11B 21/22
(52) U.S. Cl. ..................................... 360/254.8; 360/255.3
(58) Field of Search ..................................... 360/104–106, 360/254.8, 254.7, 255.6, 255.7, 255.3, 254.4; 428/323, 324

(56) References Cited

U.S. PATENT DOCUMENTS

| | | | |
|---|---|---|---|
| 4,434,202 | * 2/1984 | Uedaira et al. | 428/143 |
| 4,630,709 | * 12/1986 | Taylor | 182/48 |
| 4,879,836 | 11/1989 | Dolyny | 43/64 |
| 4,933,785 | 6/1990 | Morehouse et al. | 360/78.04 |
| 4,993,685 | * 2/1991 | Sparling | 254/88 |
| 5,034,837 | 7/1991 | Schmitz | 360/105 |
| 5,172,538 | * 12/1992 | Luger | 54/47 |
| 5,235,482 | 8/1993 | Schmitz | 360/97.02 |
| 5,341,260 | 8/1994 | Jabbari | 360/105 |
| 5,455,723 | 10/1995 | Boutaghou et al. | 360/75 |
| 5,590,006 | 12/1996 | Shafe | 360/105 |
| 5,663,846 | 9/1997 | Masuoka et al. | 360/75 |
| 5,701,219 | 12/1997 | Shafe | 360/105 |
| 5,743,689 | 4/1998 | Schlaeger | 410/30 |
| 5,825,576 | 10/1998 | Kamerbeck | 360/75 |
| 5,828,522 | 10/1998 | Brown et al. | 360/105 |
| 5,831,795 | 11/1998 | Ma et al. | 360/105 |
| 5,864,448 | 1/1999 | Berberich | 360/105 |
| 5,875,074 | 2/1999 | Ho et al. | 360/105 |
| 6,122,130 | 9/2000 | Boutaghou et al. | 360/75 |

FOREIGN PATENT DOCUMENTS

| | | |
|---|---|---|
| 5-166322 | * 7/1993 | (JP) . |
| 5-225732 | * 9/1993 | (JP) . |
| 10-302421 | * 11/1998 | (JP) . |

* cited by examiner

*Primary Examiner*—William Klimowicz
(74) *Attorney, Agent, or Firm*—Schwegman Lundberg Woessner & Kluth, P.A.

(57) ABSTRACT

A disk drive system includes a base, a disk rotably attached to the base, and an actuator assembly movably attached to the base. The actuator assembly moves the transducer to selected areas of the disk where information reprexentative of data is to be written or read. The actuator assembly maintains the transducer in a transducing relationship with the disk. The actuator assembly also parks the transducer or unloads the transducer to a park position. A portion of the actuator assembly rides over a ramp to a park position. The ramp includes a mechanism for increasing the coefficient of friction on the surface of the ramp. The coefficient of friction on the surface of the ramp is increased to help retain the actuator in its parked position. This helps maintain the actuator assembly in a parked position in the event of shock loading from dropping a computer or a disk drive. This in turn helps prevent head crashes or failure of the disk drive and possible data loss.

17 Claims, 4 Drawing Sheets

FRICTION CONTROL ON HGA RAMP LOAD/UNLOAD SURFACE

RELATED APPLICATION

This application claims the benefit of U.S. provisional application Serial No. 60/063,615, filed Oct. 27, 1997 under 35 USC119(e).

FIELD OF THE INVENTION

The present invention relates to the field of mass storage devices. More particularly, this invention relates to a disk drive which includes a ramp for loading and unloading the transducing head.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 12 microinches. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive is just before the disk drive shuts down. The small ceramic block is typically flying over the disk at a very low height when shutdown occurs. In the past, the small block was moved to a non data area of the disk where it literally landed and skidded to a stop. Problems arise in such a system. When disks were formed with a smooth surface, stiction would result between the small ceramic block and the head. In some instances the force due to stiction was so strong that it virtually ripped the head off the suspension. Amongst the other problems was a limited life of the disk drive. Each time the drive was turned off another start stop contact cycle would result. After many start stop contacts, the small ceramic block may chip or produce particles. The particles could eventually cause the disk drive to fail. When shutting down a disk drive, several steps are taken to help insure that the data on the disk is preserved. In general, the actuator assembly is moved so that the transducers do not land on the portion of the disk that contains data. There are many ways to accomplish this. A ramp on the edge of the disk is one design method that has gained industry favor more recently. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837.

Typically, the ramp is positioned to the side of the disk. A portion of the ramp is positioned over the disk itself. In operation, before power is actually shut off, the actuator assembly swings the suspension or another portion of the actuator assembly up the ramp to a park position at the top of the ramp. When the actuator assembly is moved to a position where parts of the suspension are positioned on the top of the ramp, the sliders or ceramic blocks do not contact the disk. Commonly, this procedure is known as unloading the heads. Unloading the heads helps to insure that data on the disk is preserved since, at times, unwanted contact between the slider and the disk results in data loss on the disk. The actuator assembly may be provided with a separate tang associated with each head suspension. The tang may ride up and down the ramp surface. In other drives, the ramp may be positioned such that the suspension rides up and down the ramp to unload and load the disk or disks of the disk drive.

In disk drives having a ramp for loading and unloading the transducing heads from the disk, it is critical to be able to control the friction between the portion of the suspension, such as a tang, and the ramp. Ramps typically have a complex geometry. The most cost effective way to achieve the complex geometry is to use injection molding to form the ramp. Injection molding typically employs a polymer material to form the ramp. The surface finish of the ramp is typically controlled by the polymer used for the injection molding the part. Often, the polymer material which will produce a ramp with superior thermal and mechanical stability, is not necessarily the best from the tribological standpoint. Therefore, the tribology of the ramp part is usually not considered as a factor in selecting the material for injection molding of the ramp. Friction is one of many attributes associated with tribology.

In addition, currently it is difficult to control the tribological properties of an injection molded port. As a result, optimizing the surface roughness and surface texture of the ramp to achieve low friction is very difficult, and generally not considered in the molding process. Post-modification of the surface is also difficult to do because of the complex ramp geometry and the physical properties of the polymer. Therefore, there is a problem associated with making a low friction ramp surface within the limits imposed by the polymer materials and the injection molding fabrication processes currently being used.

There is a need for a ramp having a structure that prevents stiction between the suspension and the ramp. Furthermore, there is a need for a structure that can be formed using the injection molding process. There is a need for an injection molding process and method in which the friction on the surface of a ramp used in a disk drive can be controlled without compromising the mechanical strength and integrity of the ramp. In addition, there is a need for a ramp that has the necessary thermal properties to undergo repeated thermal cycling in a disk drive. Furthermore, there is a need to have a ramp which can be made of proven materials which have very little or essentially no outgassing which would produce contaminants within the disk drive enclosure.

SUMMARY OF THE INVENTION

A disk drive system includes a base, a disk rotatably attached to the base, and an actuator assembly movably attached to the base. A ramp for loading and unloading the transducing element to and from the disk is also attached to the base. The ramp is made from a polymer material and includes inorganic materials. The inorganic materials are spherical particles of $SiO_2$ or $TiO_2$. These materials are used since they are currently available in various sizes. Inorganic materials of any chemical composition could be used. The inorganic particles are distributed in the polymer and some of the particles are exposed on the surface of the ramp. The exposed particles on the ramp surface create small bumps which will be contact points between the ramp and the suspension. The number of exposed particles and the height of the resultant bumps can be controlled by selecting the size of the inorganic particles and by controlling the concentration of the particles as mixed within the polymer. The concentration is kept below a point where the mechanical strength or the structural integrity of the ramp will be compromised. In addition, the inorganic material will not mix with the polymer nor will they produce any outgas. The materials are also durable and tough and will not become dislodged from the polymer matrix. The particles also prevent wear on the ramp surface. The particles also prevent stiction since the resultant bumps prevent stiction between a smooth suspension and a smooth ramp. The particles keep the ramp and suspension slightly separated from one another so that static friction or stiction does not occur. In addition, the suspensions of the actuator assembly will have a low enough coefficient of friction to allow the actuator assembly to slide with respect to the surface of the ramp.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
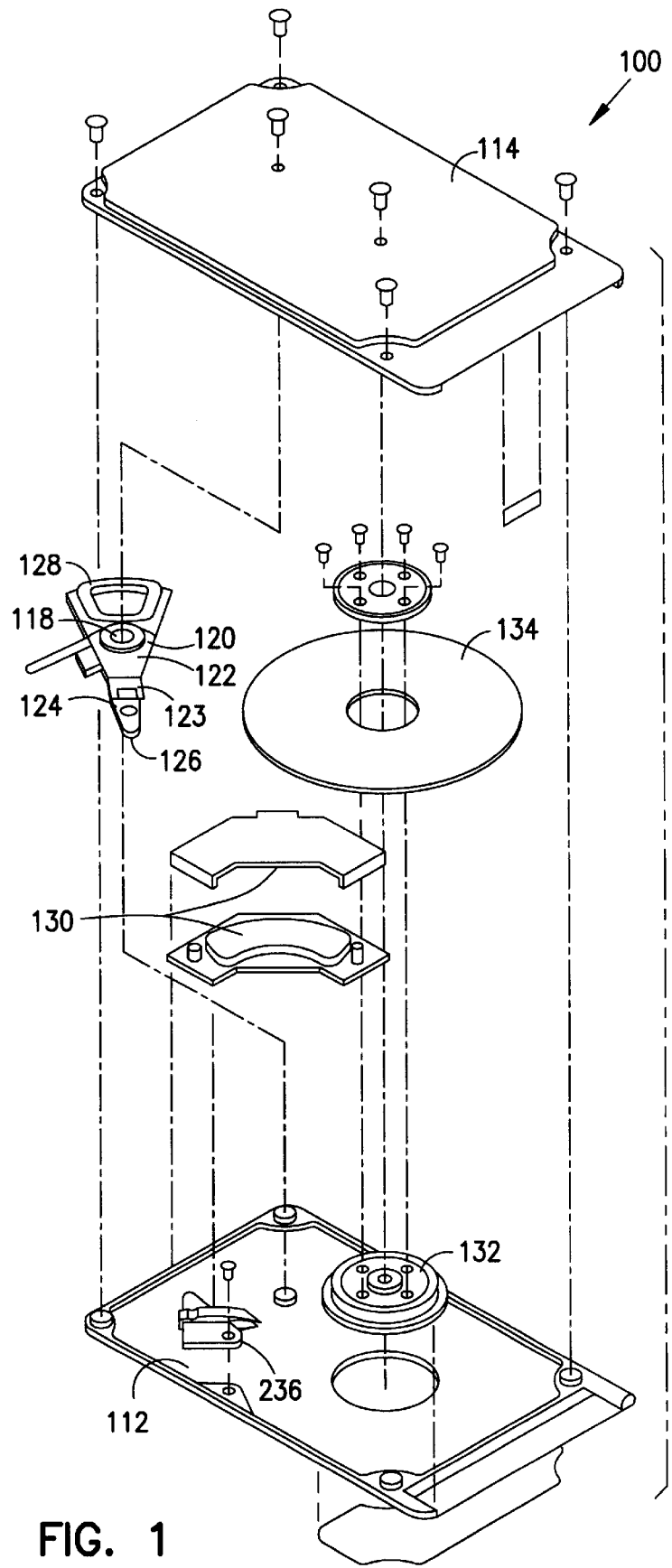
FIG. 1 is an exploded view of a disk drive.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing 112, and a housing cover 114. The housing 112 and housing cover 114 form a disk enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the housing 112 is a pair of magnets 130. The pair of magnets 130 and the voice coil 128 are key parts of a voice coil motor which applies a force to the actuator assembly 120 to rotate it about the actuator shaft 118. Also mounted to the housing 112 is a spindle motor 132. The spindle motor 132 includes a rotating portion called the spindle hub 133. In FIG. 1, a single disk 134 is attached to the spindle hub 133. In other disk drives a number of disks may be attached to the hub. The invention described herein is equally applicable to disk drives have a number of disks attached to the hub of the spindle motor.

Figure 2:
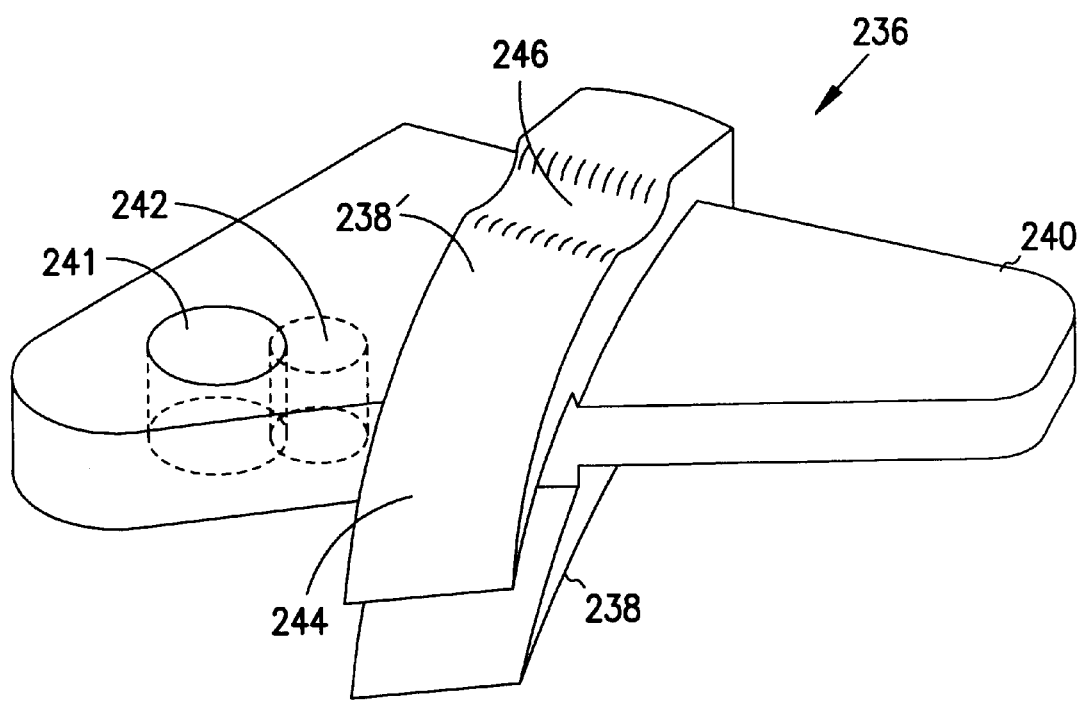
FIG. 2 is a isometric view of a ramp from a disk drive.

Also attached to the housing 112 is a ramp structure 236. Now looking at both FIGS. 1 and 2, the ramp structure has two ramp portions 238 and 238'. One of the ramp portions 238 is for the loading and unloading the transducer from the bottom surface of the disk and the other ramp portion 238' is for loading and unloading a transducer from the top surface of the disk. The ramp structure 136 shown in FIG. 2 is fixed and a portion of each of the ramp portions 238 and 238' of the ramp is positioned over the disk 134. It should be noted that this invention could also be used on ramps that rotate in and out of a load/unload position.

FIG. 2 is an isometric view detailing the ramp structure 236. The ramp structure 236 includes the ramp portions 238 and 238' and the ramp support structure 240. The support structure 240 has a first opening 241 and a second opening 242 therein which facilitate mounting the ramp 236 to a pair of corresponding pegs on the housing 112. The ramp structure 236 includes an inclined surface 244 and a parking detent 246. There is also a surface 245 positioned between the inclined surface 244 and the parking detent 246.

Figure 3:
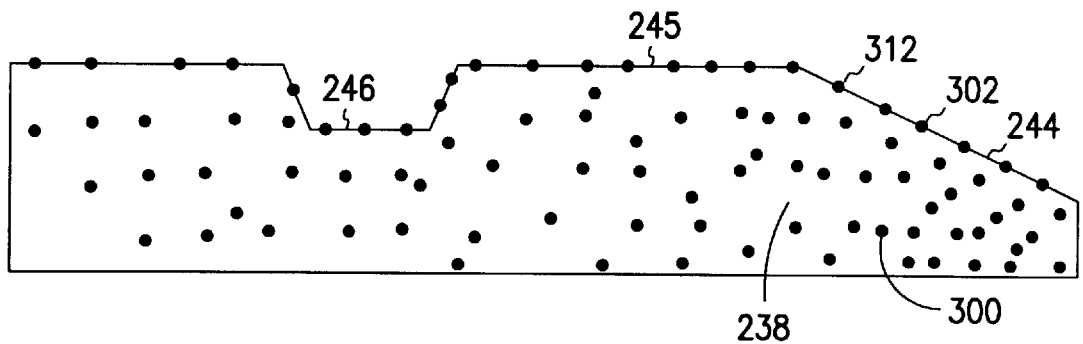
FIG. 3 is a cross sectional side view of the ramp having inorganic particles dispersed within the material of the ramp and on the surface of the ramp.

FIG. 3 is a cross sectional side view of the ramp structure 236 showing one ramp 238. The ramp 238 further includes a plurality of spherical particles 300 incorporated into the material from which the ramp 238 is made. As can be seen from the cross sectional view, many particles 300 are totally encapsulated within the material making up the ramp 238. Other particles 302 are exposed along the outer surfaces of the ramp 238. Most importantly, there are exposed particles 302 on the surface of the parking detent 246, on the inclined surface 244, and on the surface 245 positioned between the inclined surface 244 and the parking detent 246. The exposed particles 302 produce bumps 312 on the surface of the parking detent 246, on the inclined surface 244, and on the surface 245 positioned between the inclined surface 244 and the parking detent 246. The particles 300 are used to control friction on a surface of the ramp 238.

Figure 4:
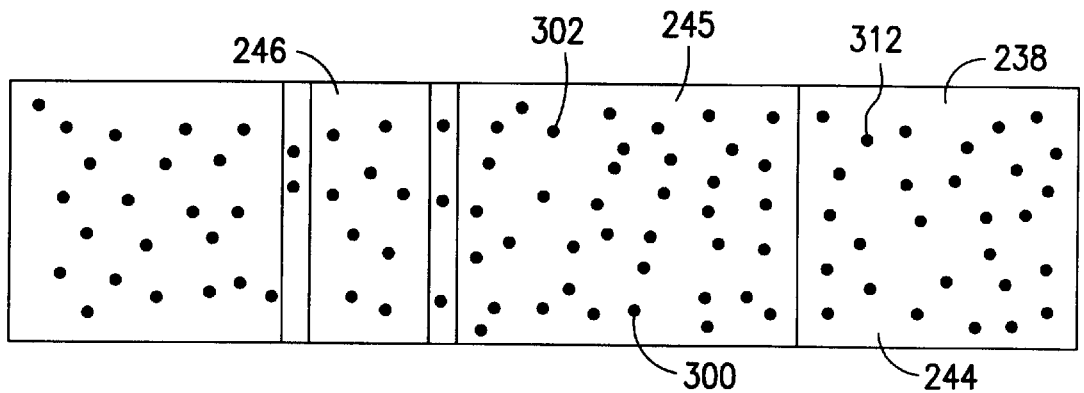
FIG. 4 is a top view of the ramp showing the ramp surface.

FIG. 4 is a top view of the ramp 238 showing the inclined surface 244, the surface of the parking detent 246, and the surface 245 positioned between the inclined surface 244 and the parking detent 246. These surfaces have a plurality of exposed particles 302 which result in bumps 312 on these surfaces.

In one preferred embodiment of the invention, inorganic spherical particles 300 are added to the polymers from which the load/unload ramp 238 is made. $SiO_2$ or $TiO_2$ are both good candidates because spherical $SiO_2$ or $TiO_2$ particles of various sizes are commercially available at low cost. The particles 300 also have excellent characteristics and do not mix with the polymer nor produce unwanted outgassing. The addition of these particles 30 to the polymer allows the same basic injection molding process for ramps 238 to still be used. The particles 300 are uniformly distributed in the polymer matrix and some of them will be exposed on the surfaces 244, 245, 246 of the ramp 238. The exposed particles 302 on the ramp surfaces 244, 245, 246 create bumps 312 which will be the contact points when another smooth surface element, such as the suspension 124, is brought into contact with the ramp 238.

The contact pattern and surface roughness can be controlled by changing the size and volume concentration of the particles 300. The size and volume concentration of the particles 300 need to be optimized for friction performance, wear property of the surface, and process capability of the composite material.

The following must be considered for size and volume concentration optimization. First, there is a minimum size of the particles 300 below which the surface texturing effect of the particles is lost. Similarly, for every particle size, there is a minimum volume concentration needed to ensure that there are an adequate number of particles 300 within the material to produce an adequate number of exposed particles 302 on the ramp surfaces 244, 245, 246. The upper limit on particle size and volume concentration is imposed by the polymer's ability to hold these particles before the composite breaks down. Given a particle size (radius R) and surface particle density (d) requirement, the volume concentration (C) of particles can be approximately estimated by assuming that the volume concentration equals to the area percentage of the particles: $C=\pi dR^2$. For a 5 $\mu$m particle and a density of 1 particle per 900 $\mu m^2$, C is about 8.7%.

In other preferred embodiments of this invention, the particles do not have to be spherical. It should be noted that other shapes and sizes of particles can also be added to the material comprising the ramp 238 at the time it is formed to produce bumps on the surfaces 244, 245, and 246 of the ramp 238. The particles are also not limited to $SiO_2$ or $TiO_2$. The particles 300 added to the material of the ramp 238 can be any material which will not wear or has adequate wear characteristics. In addition, the particle material is selected so that it will not outgas or chemically combine with the material used to make the ramp 238.

Advantageously, the friction on the ramp 238 surfaces 244, 245 and 246 can now be controlled by selecting the size of the inorganic particles and by controlling the concentration of the particles as mixed within the polymer. The concentration is kept high enough so that there are an adequate number of particles to prevent stiction between the ramp 238 and the suspension 124. The addition of the particles 300 does not compromise the mechanical strength or the structural integrity of the finished ramp 238. In addition, the same injection molding processes can continue to be used. The inorganic material will not chemically combine with the polymer and will not produce any outgas. The materials are also durable and tough and will not become dislodged from the polymer matrix. The particles also add to the wear characteristics on the ramp surface. In addition, the suspensions of the actuator assembly will have a low enough coefficient of friction to allow the actuator assembly to slide with respect to the surface of the ramp. The friction is actually lowered since static friction is controlled. By lowering the friction, the ramp minimizes wear and minimizes debris generation.

Figure 5:
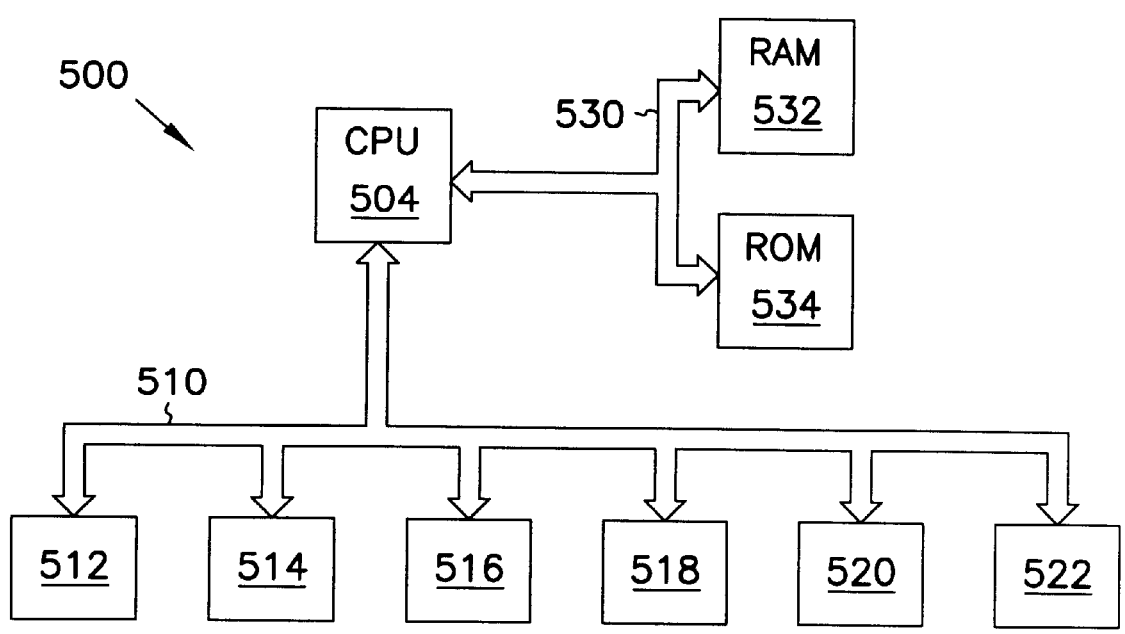
FIG. 5 is a schematic view of a computer system.

FIG. 5 is a schematic view of a computer system. Advantageously, the invention is well-suited for use in a computer system 500. The computer system 500 may also be called an electronic system or an information handling system and includes a central processing unit, a memory and a system bus. The information handling system includes a central processing unit 504, a random access memory 532, and a system bus 530 for communicatively coupling the central processing unit 504 and the random access memory 532. The information handling system 500 includes a disk drive device which includes the ramp described above. The information handling system 500 may also include an input/output bus 510 and several devices peripheral devices, such as 512, 514, 516, 518, 520, and 522 may be attached to the input output bus 510. Peripheral devices may include hard disk drives, magneto optical drives, floppy disk drives, monitors, keyboards and other such peripherals. Any type of disk drive may use the ramp having particles 300 molded therein.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disk drive comprising:

a base;

a disk rotatably attached to said base;

a suspension rotatably attached to said base the suspension including a slider with a transducer;

a ramp structure attached to the base near said disk, said ramp structure comprising a first material; and a plurality of particles, each particle comprising a second material, said particles being distributed within the ramp structure, and said particles resulting in a plurality of bumps protruding from a surface of the ramp structure, the suspension being rotatable to come into contact with the bumps protruding from the surface of the ramp structure.

2. The magnetic disk drive of claim 1 wherein the first material comprises a polymer.

3. The magnetic disk drive of claim 1 wherein the second material comprises inorganic matter.

4. The magnetic disk drive of claim 1 wherein the particles are spherically shaped.

5. The magnetic disk drive of claim 1, further comprising an actuator to move the suspension and the transducer between a loaded position where the transducer is positioned over the disk, and an unloaded position where the transducer is parked on the ramp structure, said suspension passing over the surface of the ramp structure between the loaded position and the unloaded position, wherein a plurality of the particles are exposed on the surface of the ramp structure and are spaced so that the suspension is always supported by at least two of the particles exposed on the surface of the ramp structure.

6. The magnetic disk drive of claim 1 wherein each particle comprises $SiO_2$ or $TiO_2$, and the transducer comprises a magnetic transducer.

7. The magnetic disk drive of claim 1, further comprising:

a tang attached to said suspension; and an actuator to move the suspension and the transducer between a loaded position where the transducer is positioned over the disk, and an unloaded position where the transducer is parked on the ramp structure, said tang passing over the surface of the ramp structure between the loaded position and the unloaded position.

8. A disk drive comprising:

a disk;

a ramp structure comprising a first material and being near said disk;

a suspension including a slider with a transducer suspended near said disk; and a plurality of particles comprising a second material and being distributed in the ramp structure, a subset of the particles protruding from a surface of the ramp structure, the suspension being movable to come into contact with the particles protruding from the surface of the ramp structure.

9. The disk drive of claim 8 wherein the particles comprise $SiO_2$ or $TiO_2$ and the transducer comprises a magnetic transducer.

10. The disk drive of claim 8 wherein the first material comprises a polymer.

11. An information handling system comprising:

a base;

a disk rotatably attached to said base;

an actuator assembly movably attached to said base;

a suspension attached to said actuator assembly, said suspension including a slider with a transducer, said actuator assembly being movable between a transducing position near said disk and a park position; and a ramp structure attached to said base, said ramp structure comprising a first material and having a plurality of particles distributed within the ramp structure, said particles comprising a second material and a subset of the particles being exposed on a surface of the ramp structure resulting in a plurality of bumps protruding from the surface of the ramp structure, the suspension being movable to come into contact with the bumps protruding from the surface of the ramp structure.

12. The information handling system of claim 11 wherein the particles comprise $SiO_2$ or $TiO_2$ and the transducer comprises a magnetic transducer.

13. The information handling system of claim 11 wherein the first material comprises a polymer.

14. The information handling system of claim 11, further comprising:

a central processing unit;

a memory; and a bus coupled between the central processing unit, the memory, and a magnetic disk drive including the ramp structure.

15. A magnetic disk drive comprising:

a base;

a disk rotatably attached to said base;

a ramp attached to the base near said disk; and means for controlling friction on a surface of the ramp.

16. A disk drive comprising:

a disk;

a suspension including a slider with a transducer being near said disk;

a ramp structure comprising a polymer and being near said disk; and a plurality of particles distributed in the ramp structure, said plurality of particles comprising $SiO_2$ or $TiO_2$ and a subset of the particles protruding from a surface of the ramp structure, the suspension being movable to come into contact with the particles protruding from the surface of the ramp structure.

17. The disk drive of claim 16 wherein:

the ramp structure comprises a plurality of polymers;

the transducer comprises a magnetic transducer;

the particles are uniformly distributed within the ramp structure; and a size and a volume concentration is selected for the particles distributed within the ramp structure to result in a selected contact pattern and surface roughness for surfaces of the ramp structure.

* * * * *